US012583601B2

(12) United States Patent　　　　(10) Patent No.: US 12,583,601 B2
Delarue et al.　　　　　　　　　　　　(45) Date of Patent: Mar. 24, 2026

---

(54) ASSEMBLY COMPRISING A NACELLE PANEL AND A HOUSING

(71) Applicant: Safran Nacelles, Gonfreville-l'Orcher (FR)

(72) Inventors: Jean-Baptiste Delarue, Moissy-Cramayel (FR); Laurent Georges Valleroy, Moissy-Cramayel (FR); Vianney Hus, Moissy-Cramayel (FR); Hugo Boistelle, Moissy-Cramayel (FR)

(73) Assignee: Safran Nacelles, Gonfreville-l'Orcher (FR)

( * ) Notice: Subject to any disclaimer, the term of this patent is extended or adjusted under 35 U.S.C. 154(b) by 82 days.

(21) Appl. No.: 18/351,022

(22) Filed: Jul. 12, 2023

(65) Prior Publication Data

US 2024/0124149 A1　　Apr. 18, 2024

(30) Foreign Application Priority Data

Jul. 13, 2022　　(FR) ...................................... 2207258

(51) Int. Cl.
B64D 29/08　　　　(2006.01)
B64D 29/02　　　　(2006.01)

(52) U.S. Cl.
CPC ............. B64D 29/08 (2013.01); B64D 29/02 (2013.01)

(58) Field of Classification Search
CPC ..... B64D 29/08; B64D 29/02; F05D 2260/30; F05D 2260/96; F05D 2300/603; F02K 1/80; F02K 1/827; F02K 1/72; F02K 1/763
See application file for complete search history.

(56) References Cited

U.S. PATENT DOCUMENTS

| | | | | |
|---|---|---|---|---|
| 4,533,098 A * | 8/1985 | Bonini | .................... | B64D 33/04 428/116 |
| 5,927,647 A * | 7/1999 | Masters | .................... | F02K 1/72 244/110 B |
| 10,473,057 B2 * | 11/2019 | Aten | ........................ | F16H 25/20 |
| 10,612,490 B2 * | 4/2020 | Byrne | .................... | F02K 1/625 |
| 10,859,035 B2 * | 12/2020 | Smith | .................... | F02K 1/625 |
| 2020/0018257 A1 | 1/2020 | Smith et al. | | |
| 2021/0269168 A1 * | 9/2021 | Shaner | .................... | F02K 1/827 |

OTHER PUBLICATIONS

French Search Report of FR 2207258 dated Feb. 24, 2023.

* cited by examiner

*Primary Examiner* — Medhat Badawi
*Assistant Examiner* — Vicente Rodriguez
(74) *Attorney, Agent, or Firm* — Sughrue Mion, PLLC

(57)　　　　　　　ABSTRACT

An assembly includes a nacelle panel of an aircraft engine, the nacelle panel including an outer skin, an inner skin and a central layer interposed between the outer and inner skins. The central layer has a housing, the outer skin has an opening which opens into the housing, and a linking member extends in the opening and in the housing, the linking member to be connected to an actuator.

16 Claims, 4 Drawing Sheets

ASSEMBLY COMPRISING A NACELLE PANEL AND A HOUSING

FIELD

The present disclosure relates to the thrust reversers of aircraft engines.

PRIOR ART

The thrust reversers of airplane engines are used to brake the airplane during landing once it is on the ground.

The thrust reversers with fixed grids equipping certain engines include a translating cowl (or transcowl) mounted movably and driven by actuators for its deployment and closing. Each actuator is housed between an outer panel and an acoustic inner panel of the nacelle. A metallic fitting connects the fixed end of the actuator to the inner panel. The other end of the actuator is connected to the translating cowl of the thrust reverser. The inner panel is embodied in the form of a sandwich structure comprising two skins on either side of a central honeycomb layer. The fitting is attached to the panel via attachments passing through the two skins and the central layer. Under these circumstances, the concerned area of the inner panel is reinforced with a densified honeycomb (for example densified with aluminum), to avoid the collapse of the honeycomb under the setting force of the attachments.

However, there is a trend toward the use of engines with a high expansion ratio and a wide diameter leading to lower fan rotation speeds. This leads to a need for lower vibration frequencies to be attenuated, and therefore an increase in the thickness of the acoustic treatments, and thus of the panels. This makes it harder to embody through attachments within the desired lengths and diameters. There is also a general trend toward bringing the inner and outer aerodynamic lines of the nacelle closer together, which limits the space available for placing the fitting. Little space is then available between the inner panel and the outer panel of the thrust reverser.

In this context, one possibility is to make a local reduction in thickness in the inner panel to house the attachment fitting of the actuator inside it. This is referred to as a "pandown". But this solution complicates the lay-up of the pre-impregnated material for the production of the inner panel and degrades its mechanical behavior by this geometrical discontinuity.

In addition, the use of through fittings on sandwich structure panels poses problems of dimpling (local depression of the skin) particularly during the use of attachments with milled heads on the side of the aerodynamic air path. This problem often leads to applying a reduced tightening torque and/or to thickening the skin, which affects the cost and weight of the whole assembly.

An aim of the invention is to ensure the attachment of the actuator despite these limitations.

BRIEF SUMMARY

For this purpose, provision is made for an assembly comprising:
    a nacelle panel of an aircraft engine,
    the panel comprising an outer skin, an inner skin and a central layer interposed between the outer and inner skins,
    the central layer having a housing, the outer skin having an opening which opens into the housing, and
    a linking member extending in the opening and configured to connect an actuator.

To take into account the limitations on space between the inner and outer panels, the increasing thickness of the central layers and the resulting difficulties of through attachments, the linking member is inserted into the inside of the panel. Thus, the attachment of the linking member to the panel can be provided without having recourse to attachments passing through the whole thickness of the panel and without creating any pandown. The linking member is found near the inner skin and can be attached to it easily. In the area of attachment of the linking member, the central layer does not need to be reinforced or be as dense as in the previously described solutions. The linking member can be used to join the inner and outer skins in the housing. Moreover, the presence of the housing in the central layer makes it possible to lower the attachment point of the actuator by comparison with a conventional arrangement. This gives rise to a small space between the outer panel and the acoustic inner panel.

The assembly may also have at least one of the following features:
    the linking member is bearing against an outer face of the outer skin;
    the linking member is in contact with an inner face of the inner skin;
    the outer skin and the central layer have contiguous flanks at the level of the housing; and
    the housing extends under the outer skin.

Provision can be made for the linking member to be in contact with two areas of an outer face of the outer skin disposed such that the opening is interposed between the two areas.

The linking member thus provides a link between the two sides of the outer skin around the opening.

Provision can be made for the linking member to be attached to the panel by at least one attaching element.

The assembly may moreover have at least one of any of the following features:
    the attaching element is blind;
    the attaching element extends in the outer skin;
    the attaching element extends in the central layer;
    the attaching element extends in the inner skin;
    the attaching element extends in the housing;
    the panel comprises a box delimiting the housing;
    the box is in contact with at least one of the outer and inner skins;
    the linking member comprises at least one plate configured to connect the actuator, preferably two plates together delimiting a connecting location; and
    it comprises an actuator connected to the member and extending in the housing.

Provision is also made for an aircraft engine comprising a thrust reverser and an assembly.

Provision is also made for a method for manufacturing an assembly for a nacelle of an aircraft engine, wherein,
    in the presence of a panel comprising an outer skin, an inner skin and a central layer,
    the panel having an opening in the outer skin and a housing in the central layer, the opening leading into the housing,
    a linking member configured to connect an actuator is installed in the opening and in the housing.

Provision can also be made, beforehand, for the opening and/or housing to be produced by removal of material.

Provision can be made for the method to comprise:

during the production of the panel, the placing of layers of a composite material around a core, the baking of the panel, and the removal of the core from the panel after the baking.

Provision can be made for the core to be covered with a mold release agent.

Provision can be made for producing the box by additive manufacturing.

DESCRIPTION OF THE FIGURES

Embodiments of the present disclosure will now be presented by way of non-limiting example with reference to the drawings wherein.

FIRST EMBODIMENT

A first embodiment will now be described with reference to FIGS. 1 to 4.

Figures 1, 2:
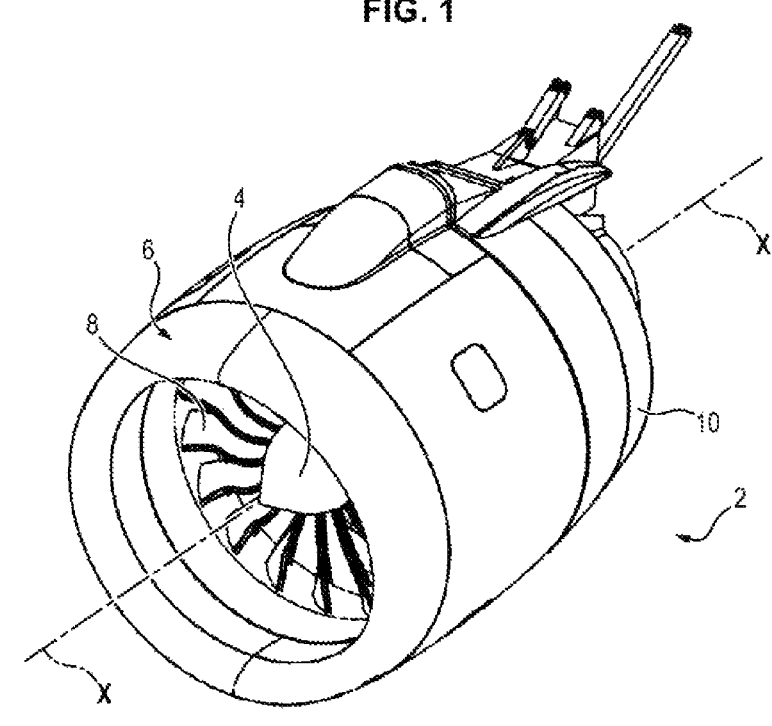
FIG. 1 is a perspective view of an aircraft engine according to a first embodiment.
FIGS. 2 to 4 are perspective and section views of an assembly equipping this engine.

FIG. 1 illustrates an aircraft engine 2 forming in this case an airplane turbojet engine. Here this is a twin spool bypass turbomachine. It comprises a rotor 4 and a stator 6 and has a main axis X-X which serves as axis of rotation of the rotor with respect to the stator.

The engine 2 particularly comprises a fan 8, one or more compressors, a combustion chamber and one or more (non-illustrated) turbines. These elements, with the exception of the fan 8, belong to a central part of the engine. Their parts movable in rotation about the axis X-X form the rotor. They define a main air flow path.

A nacelle 10 surrounds the fan 8 in such a way as to form a fan compartment and to define a secondary air flow path. The nacelle comprises one or more thrust reversers particularly including one or more translating cowls mounted movably with respect to the stator 6 and making it possible to reverse a thrust supplied by the motor after the landing during the taxiing to slow down the airplane.

The attachment to the stator of an actuator used to actuate one of the translating cowls will now be addressed.

The engine 2 is equipped with an assembly 100 comprising a nacelle panel 12 rigidly attached to the stator. The panel 12 is an acoustic inner panel, having a sandwich structure known per se, which is formed by an inner skin 14, an outer skin 16 and a central layer 18, in this case made of honeycomb, interposed between the outer 16 and inner 14 skins. The two skins are locally parallel to one another and cover opposite faces of the honeycomb layer. These three layers form a rigid stack. The skins 14 and 16 are made of composite material and comprise fibers sunk into a synthetic material matrix. The outer skin 16 is further from the axis X-X than the inner skin 14.

The central layer 18 has a housing 50 and the outer skin 16 has an opening 52 which opens into the housing 50. The housing 50 extends all the way to the inner face 54 of the inner skin 14 in this example. In other words, the entire portion of the honeycomb of the central layer 18 plumb with the opening 52 is absent, such that the inner face 54 of the inner skin 14 is bared and then faces the opening 52. The housing 50 here has the general shape of a rectangular parallelepiped. The outer skin 16 and the central layer 18 have, at the level of the housing, edges or flanks which are contiguous and in the extension of one another, which forms lateral faces of the housing 50.

A linking member 56, formed for example by a metallic fitting, extends in the opening 52, in the housing 50 and out of the panel 12, protruding from the outer skin 16. The linking member 56 is configured to connect an actuator. The linking member 56 includes a base 58 in contact with the inner face 54 of the inner skin 14 at the bottom of the housing.

The member 56 is also bearing against an outer face 60 of the outer skin 16 by way of one or more wings 62 of the member 56 extending laterally in protrusion from a central body 64 of the member 56. The wings 62 partially cover the outer face 60. The member 56 is in contact with areas of this face 60 disposed on either side of the opening 52 such that this latter is interposed between the areas. In this example, the member 56 includes a single wing 62 having a "C" shape in top view as in FIG. 6, and extending over one half-turn around the housing 50.

The linking member 56 is rigidly attached to the panel 12 by attaching elements 66, 68, in this case blind. These are rivets or bolts. The term "blind element" here means elements which are configured to be installed in a part without being able to access the free terminal end of the element inserted into the part. During the placing of the attaching element, this free end forms a protuberance ensuring the blocking of the element.

Figures 3, 4:
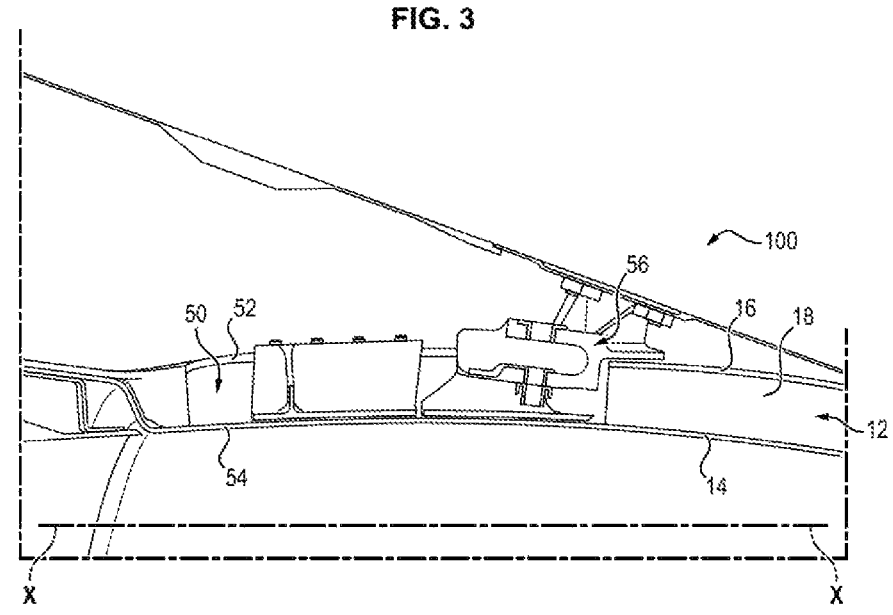

One of them, visible on the left in FIG. 4, extends in the outer skin 16 and in the central layer 18. Its head is bearing against the outer face 60 and its free end opposite the head is located in the central layer. This attaching element does not extend in the inner skin 14. In this example, seven other attaching elements 66 are in this configuration, four in total being visible on the half section view of FIG. 2.

Another 68 of the attaching elements extends in the inner skin 14, the housing 50 and the base 58. The head of this attaching element 68 is bearing against the lower face 69 of the inner skin 14 and its free end opposite the head is located in the housing 50, bearing against the base 58. This attaching element does not extend in the outer skin 16 or in the central layer 18. In this example, five other attaching elements 68 are in this configuration, three in total being visible on the half section view of FIG. 2.

All these attaching elements 66, 68 are in this case placed from outside the panel 12, on the skin side.

The linking member 56 comprises two plates or platforms 70 configured to connect the actuator, together delimiting a connecting location. The two plates extend parallel to one another, remote from one another and one above the other and above the base 58. They each have an orifice 72 perpendicular to the general plane of the skins, the two orifices being coaxial on an axis 74 radial to the axis X-X. A non-illustrated actuator is connected to the coupling member 56 and extends in the housing 50, in a way that will be detailed in the second embodiment.

It can be observed that the linking member 56 does not occupy the entirety of the housing 50 such that parts of the volume of the latter remain free. A large part of this housing left free allows the containing and travel of the actuator.

This allows the attachment of the actuator 78 by means of a small space between the outer panel of the nacelle 10 and the acoustic inner panel 12.

The method for manufacturing of the assembly comprises the following steps in this embodiment.

To produce the panel 12, a stack is made of the inner skin 14, the outer skin 16 and the honeycomb central layer 18 interposed between them. For example, a stack is made of pre-impregnated composite material layers intended to form the skins, with interposition of the honeycomb layer. This is the lay-up.

Next the stack is heated for the baking of the panel which produces the curing of the matrix forming the skins. The stack is pressed during this step.

Next, the opening is made 52 in the outer skin 16 and the housing 50 in the central layer 18. This routing operation takes place by removal of material and can be done by machining. Care must then be taken not to damage the structural plies of the inner skin. The machining can be done using relative coordinates on the inner skin with respect to the outer skin, in order to limit the shimming necessary during the installation of the linking member 56.

Next, the linking member 56 is installed in the opening 52 and the housing 50. The attaching elements 66, 68 are then fitted and a protuberance forms in the honeycomb for the elements 66.

Then one end of the actuator is connected to the member 56. The other end of the actuator is connected to the translating cowl of the thrust reverser.

Second Embodiment

Figure 5:
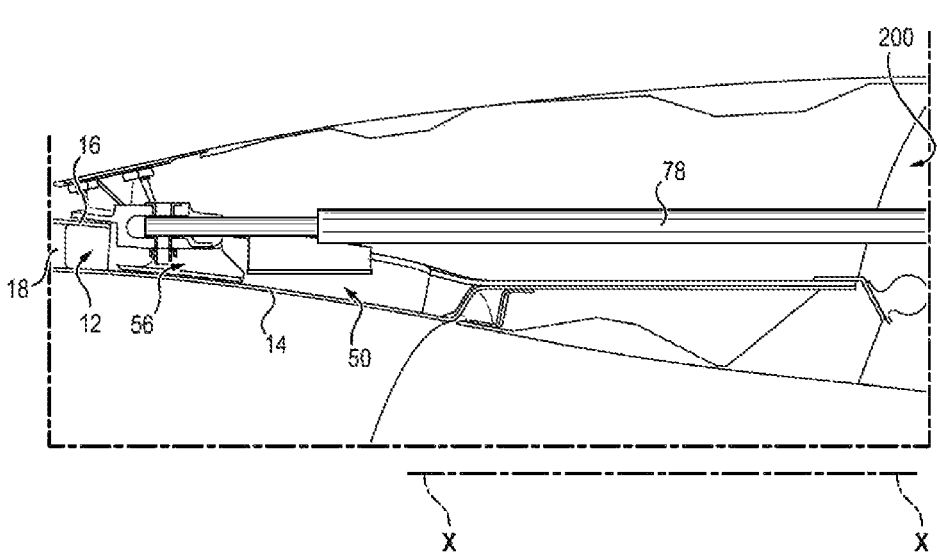
FIGS. 5 to 7 are views similar to FIGS. 2 to 4 illustrating a second embodiment.
Figure 6:
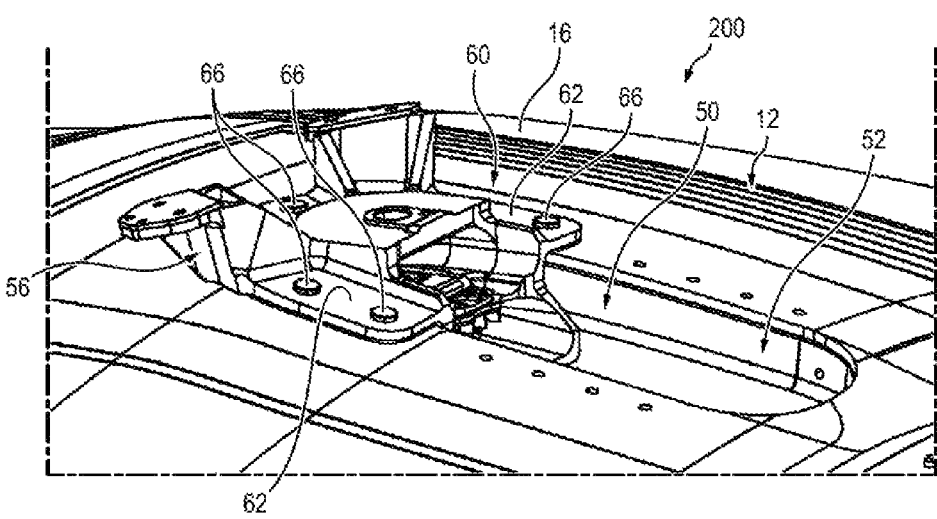

A second embodiment of the assembly 200 will now be described with reference to FIGS. 5 to 7. This description will mainly concern the features of this assembly which differ from those of the first embodiment.

Figure 7:
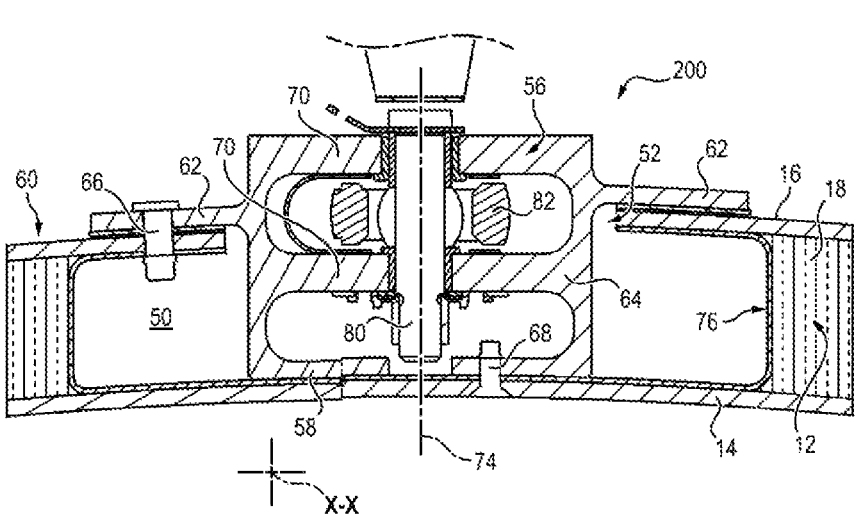

This time, as shown particularly in FIG. 7, the housing 50 further extends under the outer skin 16. This time the housing, contrary to the first embodiment, has an undercut shape.

The panel 12 comprises a box 76 delimiting the housing 50. The box is found entirely contained in the central layer 18. It is in contact with each of the outer 16 and inner 14 skins in this example. More precisely, the box 76 which has the general shape of a rectangle parallelepiped has its surface bearing against the inner faces of the outer 16 and inner 14 skins and against the flank of the central layer 18 interrupted at the location of the housing 50. The box 76 is rigidly attached to the panel.

The base 58 of the linking member 56 is this time in contact with the inner face of the box 76 forming the bottom of the box, in the latter, at the bottom of the housing 50.

As previously, the linking member 56 is in bearing against the outer face 60 of the outer skin 16 by the wing or wings 62. It is bearing, along a direction radial to the axis X-X, against two areas of this face 60 disposed on either side of the opening 52.

The attachment of the actuator 78 is the same in these two embodiments and will here be detailed with reference to FIGS. 5 and 7. The assembly comprises for this purpose a pivot 80 threaded through the orifices 72 of the two plates 70, as well as a hook 82 threaded onto the pivot between the platforms and also connected to the actuator. The actuator extends along a direction parallel to the axis X-X or a direction near this axis. Its non-illustrated end is connected to the translating cowl of the thrust reverser in order to move it.

For the implementation of the method aiming to obtain this assembly, the box 76 can be produced in situ. To do this, separately from the production of the stack intended to form the panel 12, layers of pre-impregnated composite material are put in place around a core previously covered with a mold release agent. The latter can be a dry lubricant comprising polytetrafluoroethylene. The core can be made of foam, resin or a thermoplastic material. This can be a water-soluble core or else an element which can be inflated with air. The core has a male shape complementing the female shape of the box 76 to be formed. The lay-up takes place around the core. A sub-assembly is thus constituted.

During the lay-up for the constitution of the stack intended to form the panel 12, this sub-assembly is installed as such in the stack.

Next the baking of this stack is carried out.

After the baking, the opening 52 is made in the outer skin and an opening is made in the box giving access to the core which is found inside. The core is removed from the panel 12 through the opening, this removal being facilitated by the mold release agent. The volume left free by the core forms the box 76 delimiting the housing 50.

After the removal of the core and the disposition of the linking member 56 in the box 76, the linking member 56 is rigidly attached to this panel 12 by the blind attaching elements 66, 68. Their arrangement is similar to the first embodiment. In addition, each blind attaching element 66, 68 passes through the box 76. The attaching elements 66 for which provision is made at the level of the outer skin 16 this time extend in the housing 50 and no longer in the central layer 18. The edges of the box 76 allow the installation of blind fasteners provided by the elements 68 with the possibility of checking the correct formation of the protuberance. Next, the linking member 56 is attached through the bottom of the box 76 from the inner skin 14 of the panel.

The linking member 56 and the box 76 provide the link between the inner and outer skins of the panel.

These two embodiments may be combined within one and the same engine, one of the thrust reversers being embodied in accordance with the first mode and the other in accordance with the second. For example, the first reverser can be the one located on lower part of the engine, at 6 o'clock, while the other is that located on the upper part, at 12 o'clock, (according to the usual time-based marking around the axis X-X of the engine).

Many modifications may be made without departing from the scope thereof.

The invention claimed is:

1. An assembly comprising:
    a nacelle panel of an aircraft engine, the nacelle panel comprising:
        an outer skin having a first outer face and a first inner face opposite to each other;
        an inner skin having a second outer face and a second inner face opposite to each other; and
        a central layer having a third outer face and a third inner face opposite to each other, the central layer being interposed between the outer skin and the inner skin such that the first inner face contacts the third outer face, the second outer face contacts the third inner face, and the second inner face faces an air flow path of the aircraft engine,
    wherein:
        the outer skin has an opening which extends between the first outer face and the first inner face,
        the central layer has a housing which extends between the third outer face and the third inner face,
        the opening opens into the housing, and
        the opening is closed by the second outer face; and
    a linking member that extends in the opening and in the housing, the linking member configured to be connected to an actuator.
2. The assembly of claim 1, wherein the outer skin and the central layer have contiguous flanks at a level of the housing.

3. The assembly of claim 1, wherein the housing extends transversely to the opening under the first inner face.

4. The assembly of claim 1, wherein the linking member is in contact with two areas of the first outer face, and wherein the two areas are disposed such that the opening is interposed between the two areas.

5. The assembly of claim 1, wherein the linking member is attached to the nacelle panel via an attaching element extending in the outer skin.

6. The assembly of claim 5, wherein the linking member is attached to the nacelle panel via an attaching element extending in the central layer.

7. The assembly of claim 1, wherein the linking member is attached to the nacelle panel via an attaching element extending in the inner skin.

8. The assembly of claim 1, wherein the linking member is attached to the nacelle panel via an attaching element extending in the housing.

9. The assembly of claim 1, wherein the nacelle panel further comprises a box delimiting the housing.

10. The assembly of claim 9, wherein the box is in contact with at least one of the first inner face and the second outer face.

11. The assembly of claim 1, wherein the linking member comprises at least one plate configured for connection to the actuator.

12. The assembly of claim 11, wherein the linking member comprises two plates together delimiting a connecting location.

13. A method for manufacturing an assembly for a nacelle of an aircraft engine, the method comprising:

disposing a linking member into an opening of an outer skin of a nacelle panel and within a housing in a central layer of the nacelle panel, the nacelle panel comprising:

the outer skin having a first outer face and a first inner face opposite to each other;

an inner skin having a second outer face and a second inner face opposite to each other; and the central layer having a third outer face and a third inner face opposite to each other, the central layer being interposed between the outer skin and the inner skin such that the first inner face contacts the third outer face, the second outer face contacts the third inner face, and the second inner face faces an air flow path of the aircraft engine, wherein:

the opening extends between the first outer face and the first inner face, the housing extends between the third outer face and the third inner face, the opening opens into the housing, the opening is closed by the second outer face, and the linking member is configured for connection of an actuator thereto.

14. The method of claim 13, comprising forming at least one of the opening and the housing by removal of material.

15. The method of claim 13, further comprising:

forming the nacelle panel by placing layers of a composite material around a core;

baking the panel; and removing the core from the panel after the baking.

16. An assembly comprising:

a nacelle panel of an aircraft engine, the nacelle panel comprising:

an outer skin having a first outer face and a first inner face opposite to each other;

an inner skin having a second outer face and a second inner face opposite to each other; and a central layer having a third outer face and a third inner face opposite to each other, the central layer being interposed between the outer skin and the inner skin such that the first inner face contacts the third outer face, the second outer face contacts the third inner face, and the second inner face faces an air flow path of the aircraft engine, wherein:

the outer skin has an opening which extends between the first outer face and the first inner face, the central layer has a housing which extends between the third outer face and the third inner face, the opening opens into the housing, and the opening is closed by the second outer face; and a linking member that extends in the opening and in the housing, the linking member configured to be connected to an actuator, wherein the nacelle panel further comprises a box delimiting the housing.

* * * * *